United States Patent
Sugioka

(10) Patent No.: US 9,361,575 B2
(45) Date of Patent: Jun. 7, 2016

(54) METHOD OF PROGRAMMING A NEURAL NETWORK COMPUTER

(71) Applicant: Volvo Car Corporation, Goeteborg (SE)

(72) Inventor: Ichiro Sugioka, Newbury Park, CA (US)

(73) Assignee: Volvo Car Corporation, Gothenburg (SE)

( * ) Notice: Subject to any disclaimer, the term of this patent is extended or adjusted under 35 U.S.C. 154(b) by 194 days.

(21) Appl. No.: 14/102,874

(22) Filed: Dec. 11, 2013

(65) Prior Publication Data

US 2015/0161505 A1    Jun. 11, 2015

(51) Int. Cl.
*G06N 3/00* (2006.01)
*G06N 3/02* (2006.01)
*G06K 9/00* (2006.01)

(52) U.S. Cl.
CPC .............. *G06N 3/02* (2013.01); *G06K 9/00832* (2013.01)

(58) Field of Classification Search
CPC ......................................................... G06N 3/02
See application file for complete search history.

(56) References Cited

U.S. PATENT DOCUMENTS

| | | | | |
|---|---|---|---|---|
| 5,434,927 A * | 7/1995 | Brady | ..................... | G08G 1/015 348/148 |
| 5,541,590 A * | 7/1996 | Nishio | ................... | B60K 28/14 340/435 |
| 5,613,039 A * | 3/1997 | Wang | ..................... | G01J 3/453 342/70 |
| 6,163,755 A * | 12/2000 | Peer | ....................... | B61J 23/041 340/436 |
| 6,470,272 B2 * | 10/2002 | Cong | .................... | G01S 13/723 340/436 |
| 6,526,352 B1 * | 2/2003 | Johnson | ............. | G01C 21/3697 342/357.31 |
| 7,046,822 B1 * | 5/2006 | Knoeppel | ............. | B60W 30/16 348/169 |
| 7,062,071 B2 * | 6/2006 | Tsujino | ................. | G06T 7/0044 382/103 |
| 8,509,523 B2 * | 8/2013 | Schamp | ............. | B60R 21/0134 340/425.5 |
| 9,015,093 B1 * | 4/2015 | Commons | .......... | G01C 21/3602 701/23 |

(Continued)

FOREIGN PATENT DOCUMENTS

| GB | 2495265 | 4/2013 |
|---|---|---|
| GB | 2495265 A | 4/2013 |

(Continued)

OTHER PUBLICATIONS

Machine Learning for Advising a Driver: A Survey, by Campbell, published 2002.*

(Continued)

*Primary Examiner* — Jeffrey A Gaffin
*Assistant Examiner* — Thomas Fink
(74) *Attorney, Agent, or Firm* — Brooks Kushman P.C.

(57) ABSTRACT

A method is disclosed for programming a target neural network computer for use in cognitive computing systems in automotive safety applications. An observer neural network computer is integrated into active safety systems of a plurality of vehicles to observe signals. Each respective observer neural network computer is arranged to observe signals from a forward facing camera and signals from a driver action monitor of its respective vehicle, to process the observed signals from the forward facing camera of its respective vehicle and correlate them with the observed signals from the driver action monitor of its respective vehicle. The correlated signals from the plurality of observer neural network computers are combined, and the target neural network computer is programmed for use in cognitive computing systems in automotive safety applications based on said combined correlated signals.

20 Claims, 2 Drawing Sheets

(56) References Cited

U.S. PATENT DOCUMENTS

| | | | |
|---|---|---|---|
| 2004/0107033 A1* | 6/2004 | Rao | B60R 21/0156 701/45 |
| 2007/0057781 A1* | 3/2007 | Breed | B60K 35/00 340/457.1 |
| 2007/0280505 A1* | 12/2007 | Breed | B60W 40/08 382/104 |
| 2008/0040004 A1* | 2/2008 | Breed | B60R 21/0134 701/45 |
| 2008/0051957 A1* | 2/2008 | Breed | B60R 21/01552 701/36 |
| 2008/0172177 A1* | 7/2008 | Sherony | G06K 9/00805 701/301 |
| 2009/0198396 A1* | 8/2009 | Rodriguez | B60W 10/08 701/22 |
| 2010/0109881 A1* | 5/2010 | Eskandarian | A61B 5/6887 340/575 |
| 2015/0015384 A1* | 1/2015 | Shima | B60W 30/095 340/435 |

FOREIGN PATENT DOCUMENTS

| | | |
|---|---|---|
| GB | 2495265 | 10/2013 |
| WO | 2007011976 | 1/2007 |

OTHER PUBLICATIONS

Stereo- and Neural Network-Based Pedestrian Detection, by Zhao, published 2000.*
Vision-based neural network Road and Intersection Detection and Traversal, by Jochem, published 1995.*
Particle swarm optimization of feedforward neural networks for the detection of drowsy driving, by Sandberg, published 2008.*
Multi-Source Information Fusion for Drowsy Driving Detection Based on Wireless Sensor Networks, by Wei, published 2013.*
A Smartphone-Based Driver Safety Monitoring System Using Data Fusion, by Lee ,published 2012.*
Vehicle crash modelling using recurrent neural networks, by Omar, published 1998.*
Maniac: Next Generation Neurally Based Autonomous Road Follower, by Jochem, published 1993.*
European Patent Office, Extended European Search Report Communication for corresponding European Patent Application No. 14195322.4 mailed Apr. 20, 2015.
European Patent Office, Written Opinion for corresponding European Patent Application No. EP 14195322.4 mailed Apr. 20, 2015.
European Patent Office, European Search Report for corresponding European Patent Application No. 14195322.4 mailed Apr. 20, 2015.
Andrew S. Cassidy, et al., Cognitive Computing Building Block: A Versatile and Efficient Digital Neuron Model for Neurosynaptic Cores, dated 2011.
Andrew Amir, et al., Cognitive Computing Programming Paradigm: A Corelet Language for Composing Networks of Neurosynaptic Cores, dated 2011.
Steve K. Esser, et al., Cognitive Computing Systems: Algorithms and Applications for Networks of Neurosynaptic Cores, dated 2011.

* cited by examiner

METHOD OF PROGRAMMING A NEURAL NETWORK COMPUTER

TECHNICAL FIELD

Embodiments herein relate to a method of programming a target neural network computer for use in cognitive computing systems in automotive safety applications.

BACKGROUND

One area of automotive vehicle technology that is evolving rapidly is the area of automotive safety applications, such as vehicle borne active safety systems. Currently most active safety systems, for example brake assist, traction control, driver assistance, and adaptive cruise control systems, comprises computers for handling information input from numerous sensors and vehicle systems in order to assess risk and provide safety enhancing support to vehicle drivers.

However, in many ways computers today are nothing more than very fast number-crunchers which have the ability to process lots of data, although usually restricted to perform a number of pre-programmed instructions in response to certain input signals.

In automotive safety applications, however, the number of input signals available in a vehicle grows larger, faster and more diverse by the day. Thus, this traditional type of computing model is inadequate to process and make sense of the volumes of information that the automotive safety applications of tomorrow will need to deal with.

Also, a lot of input data in automotive safety applications now comes in unstructured forms such as video, images, symbols and similar. Thus, a new computing model is needed in order for automotive safety applications to process and make sense of it. Such a new computing model is provided by cognitive computing systems, such as developed by IBM and others under US DARPA SyNAPSE (Systems of Neuromorphic Adaptive Plastic Scalable Electronics) project.

Rather than being programmed to anticipate every possible answer or action needed to perform a function or set of tasks in response to certain input signals, cognitive computing systems can process unstructured data and learn by experience, much in the same way humans do.

When utilizing such new cognitive computing systems in automotive safety applications, such as vehicle borne active safety systems, there comes the need for new ways of programming these cognitive computing systems to enable the development of new sensory-based cognitive computing applications.

A previous document, GB 2495265 relates to an artificial memory system and a method of continuous learning for predicting and anticipating human operator's action as response to ego intention as well as environmental influences during machine operation. The artificial memory system comprises a Hierarchical Temporal Memory (HTM), which is a biomimetic model based on the memory prediction theory of the brain neocortex, it combines and extends the approaches used in Bayesian networks, spatial and temporal clustering algorithms and uses a hierarchy of nodes like a neural network. The HTM is trained so that it can classify, predict and/or filter signals coming from sensor inputs.

A specific deployment of this system according to GB 2495265 is in the automotive field. In this case it is assumed that the "tool" is the car and the "human" is the device. This system has two operation modes: "active" and "learning". In "active" mode the car is in use while in "learning" mode the car may be parked in a garage or in an appropriate place with the engine turned off. In the "active-mode" a module senses the environment nearby the car using a set of sensors, such as cameras, Lidars, temperature/humidity sensors, accelerometers, etc. The module also senses dynamic response of the car to human actions, like lateral acceleration, frontal acceleration, speed, etc. Further, the module also senses "raw" driver commands, e.g. the position of steering wheel, etc. The signals generated are collected by the Artificial Memory System, which is equipped with memory patterns describing the behavior of the car. By exploiting this memory this module can classify, predict or filter the sensors data coming from the car and then send back the computation results. A database stores "raw" unexpected input pattern that may be used for improving the system performance. In the learning mode, a Pattern Recorder feeds the previously stored patterns in the database to the artificial memory system to train it over them. By this combination of signals the artificial memory system is learning the new patterns provided by the Pattern Recorder module.

However, cognitive computing systems get better over time as they build knowledge and learn a domain, its processes and its methods of interacting. Thus, although GB 2495265 proposes one method of having an automotive system learn from its experiences, there is room for further improvement. This in particular as this new type of neural network computers operating in accordance with such new computing models, as provided by cognitive computing systems, e.g. such as those mentioned above developed by IBM and others under US DARPA SyNAPSE (Systems of Neuromorphic Adaptive Plastic Scalable Electronics) project, require new method of programming to optimize their use in vehicles.

SUMMARY

Embodiments herein aim to provide an improved cost effective method of programming a target neural network computer for use in cognitive computing systems in automotive safety applications.

This is provided through a method comprising the steps of: integrating a respective observer neural network computer into respective active safety systems of a plurality of vehicles only to observe signals; arranging each respective observer neural network computer to observe signals from a forward facing camera of its respective vehicle; arranging each respective observer neural network computer to observe signals from one or more driver action monitoring devices of its respective vehicle; arranging each respective observer neural network computer to process said observed signals from said respective forward facing camera of its respective vehicle and to correlate them with said observed signals from said respective one or more driver action monitoring devices of its respective vehicle; combining correlated signals from said plurality of said observer neural network computers; and programming said target neural network computer for use in cognitive computing systems in automotive safety applications based on said combined correlated signals.

Programming a target neural network computer for use in cognitive computing systems in automotive safety applications according to the above method provides for combining the "experience" of numerous observer neural network computers such that target neural network computer based active safety systems for use in future vehicles can benefit from the experience of numerous drivers.

According to a second aspect said step of arranging each respective observer neural network computer to observe signals from a forward facing camera of its respective vehicle comprises arranging each respective observer neural network computer to observe signals from a forward facing pedestrian detection camera of its respective vehicle.

Through observing signals from a forward facing pedestrian detection camera and allowing each respective observer neural network computer to correlate what it sees through its pedestrian detection camera with actions taken by the driver of its respective vehicle, the respective observer neural network computer is able to program itself. If the driver's action results in an accident or corrective actions, the observer neural network computer will learn what to avoid.

According to a third aspect said step of arranging each respective observer neural network computer to observe signals from one or more driver action monitoring devices of its respective vehicle comprises arranging each respective observer neural network computer to observe signals from at least one driver monitoring camera.

Through arranging each respective observer neural network computer to observe signals from at least one driver monitoring camera self-learning programming of the observer neural network computer will benefit from having access to a camera that observes the driver's actions in various situations.

According to a fourth aspect said step of arranging each respective observer neural network computer to process said observed signals from said respective forward facing camera of its respective vehicle comprises arranging each respective observer neural network computer to process said observed signals from said respective forward facing camera of its respective vehicle to recognize visual patterns and to correlate said visual patterns with said observed signals from said respective one or more driver action monitoring devices of its respective vehicle.

As currently available observer neural network computers are designed for recognition of visual patterns said provision of arranging each respective observer neural network computer to process said observed signals from said respective forward facing camera of its respective vehicle to recognize visual patterns is a suitable setup for processing signals from forward facing cameras, such as commonly available pedestrian detection cameras.

According to a fifth aspect said step of arranging each respective observer neural network computer to observe signals from one or more driver action monitoring devices of its respective vehicle comprises arranging each respective observer neural network computer to observe signals from at least one of a steering wheel angle sensor, a throttle position sensor, a brake pedal position sensor, activation of a turn indicator, activation of a hazard warning, activation of headlights and activation of windscreen wipers.

The provision of arranging each respective observer neural network computer to observe signals from at least one of a steering wheel angle sensor, a throttle position sensor, a brake pedal position sensor, activation of a turn indicator, activation of a hazard warning, activation of headlights and activation of windscreen wipers, etc., provides for the provision of diverse and multi-faceted input signals to the observer neural network computer, enhancing its self-learning programming experience.

According to a sixth aspect said step of integrating a respective observer neural network computer into respective active safety systems of a plurality of vehicles only to observe signals comprises integrating a respective observer neural network computer into respective active safety systems of at least one hundred vehicles.

The provision of integrating a respective observer neural network computer into respective active safety systems of at least one hundred vehicles provides a basis for enhancing its self-learning programming experience as this now can be based on the experience of hundreds of vehicle drivers, possibly from all around the world.

According to a seventh aspect said step of combining correlated signals from said plurality of said observer neural network computers comprises combining correlated signals from at least one hundred vehicles.

The provision of combining correlated signals from at least one hundred vehicles provides for enhancing programming of said target neural network computer as programming thereof will be based on the experience of hundreds of vehicle drivers, possibly from all around the world.

BRIEF DESCRIPTION OF THE DRAWINGS

In the following, embodiments herein will be described in greater detail by way of example only with reference to attached drawings, in which.

Figure 1:
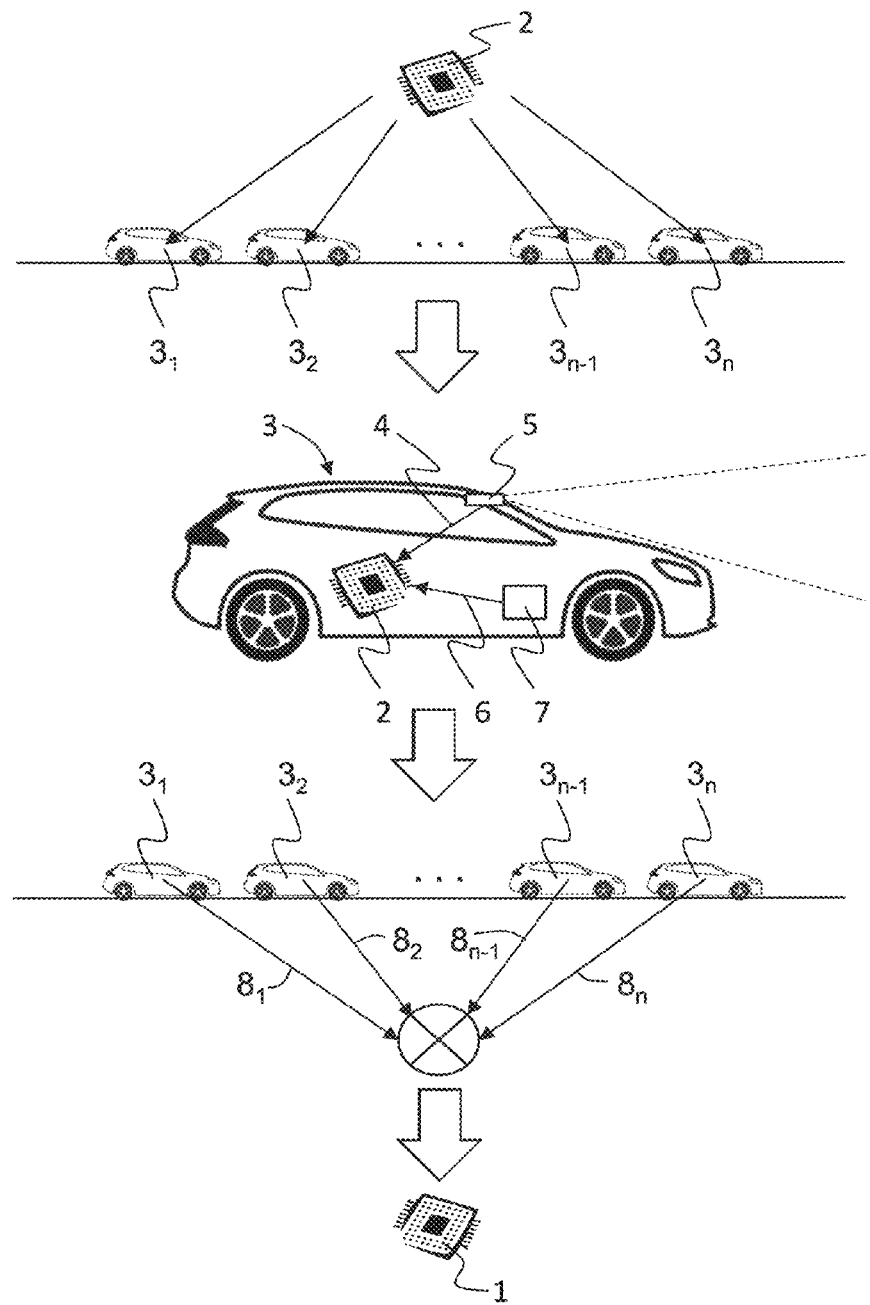
FIG. 1 is a schematic illustration of the method of programming a target neural network computer for use in cognitive computing systems in automotive safety applications according to embodiments hereof.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein. Like reference numerals designate like elements throughout the specification.

DETAILED DESCRIPTION

As required, detailed embodiments are disclosed herein. However, it is to be understood that the disclosed embodiments are merely exemplary and embodiments may take various and alternative forms. Specific structural and functional details disclosed herein are not to be interpreted as limiting, but merely as a representative basis for teaching one skilled in the art.

FIG. 1 is a schematic illustration of the method of programming a target neural network computer 1, e.g., embodied as a target neural network computer chip (not shown), for use in cognitive computing systems in automotive safety applications according to embodiments hereof.

In accordance with the proposed method, and as illustrated at the top level of FIG. 1, a respective observer neural network computer 2 may be integrated into respective active safety systems (not shown) of a plurality of vehicles $3_1, 3_2, \ldots, 3_{n-1}, 3_n$ only to observe signals. The observer neural network computer 2 will not affect a respective vehicle 3 or its active safety system at all but simply observe signals therein, as described in the following.

According to embodiments hereof a respective observer neural network computer 2 is integrated into respective active safety systems (not shown) of multiple vehicles 3, such as at least one hundred vehicles 3.

Moving now one level down in the method flow illustrated in FIG. 1 is illustrated one vehicle 3 out of said plurality of vehicles $3_1, 3_2, \ldots, 3_{n-1}, 3_n$. Here is further illustrated how each respective observer neural network computer 2 is arranged to observe signals 4 from a forward facing camera 5 of its respective vehicle 3, and each respective observer neural network computer 2 is further arranged to observe signals 6 from one or more driver action monitoring devices 7 of its respective vehicle 3.

According to some embodiments hereof each respective observer neural network computer 2 is arranged to observe signals from a forward facing pedestrian detection camera 5 of its respective vehicle. This is a convenient arrangement, as many active safety systems in vehicles already comprise such a forward facing pedestrian detection camera 5.

Figure 2:
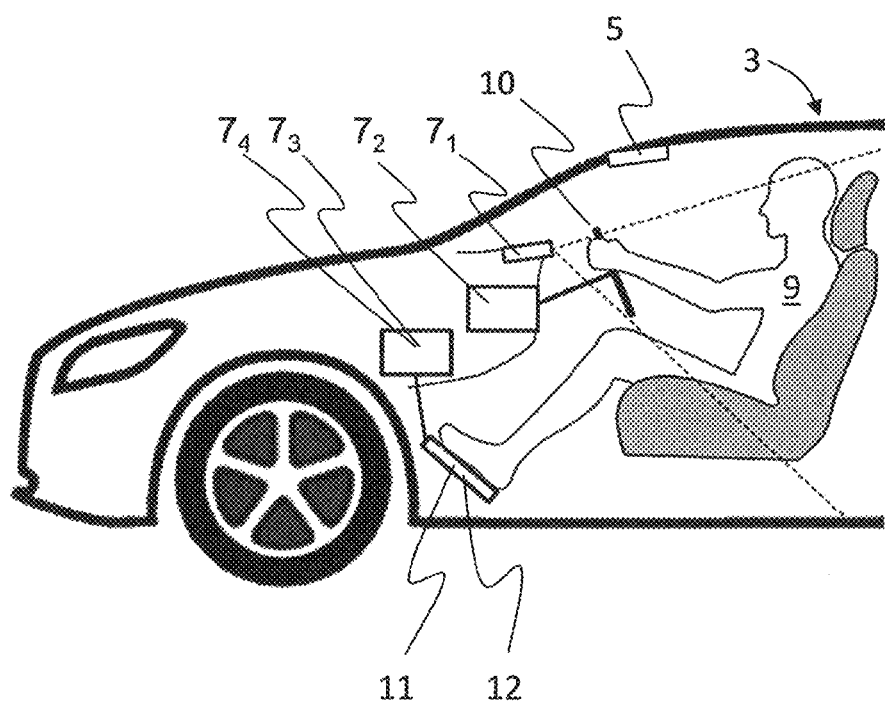
FIG. 2 is a schematic illustration of driver action monitoring devices in a vehicle having an observer neural network computer integrated into an active safety system thereof.

In yet some embodiments hereof each respective observer neural network computer 2 is arranged to observe signals 6 from at least one of a steering wheel angle sensor $7_2$, a throttle position sensor $7_3$, a brake pedal position sensor $7_4$ (see FIG. 2). Additional examples of driver actions that can be monitored are: activation of turn indicator and hazard warning, activation of headlights, activation of windscreen wipers, etc. (not shown).

Through arranging each respective observer neural network computer 2 to observe signals 6 from such driver action monitoring devices 7 as at least one of a steering wheel angle sensor $7_2$, a throttle position sensor $7_3$, a brake pedal position sensor $7_4$, activation of a turn indicator, activation of a hazard warning, activation of headlights and activation of windscreen wipers, etc., is allowed, in further embodiments, the provision of diverse and multi-faceted input signals 6 to said observer neural network computer 2, enhancing its self-learning programming experience.

According to still further embodiments hereof each respective observer neural network computer 2 is arranged to process said observed signals 4 from said respective forward facing camera 5 of its respective vehicle 3 to recognize visual patterns and to correlate said visual patterns with said observed signals 6 from said respective one or more driver action monitoring devices 7 of its respective vehicle 3.

This is particularly advantageous as currently available observer neural network computers 2 are designed for recognition of visual patterns. Hence, said provision of arranging each respective observer neural network computer 2 to process said observed signals 4 from said respective forward facing camera 5 of its respective vehicle 3 to recognize visual patterns is a suitable setup for processing signals 4 from forward facing cameras 5, such as commonly available pedestrian detection cameras 5.

In yet further embodiments hereof each respective observer neural network computer 2 is arranged to observe signals 6 from at least one driver monitoring camera $7_1$ (see FIG. 2). Said observer neural network computer 2 will benefit from, and improve its learning, through having access to a driver monitoring camera $7_1$ that observes a driver's 9 actions in various situations.

Furthermore, each respective observer neural network computer 2 is arranged to process said observed signals 4 from said respective forward facing camera 5 of its respective vehicle 3 and to correlate them with said observed signals 6 from said respective one or more driver action monitoring devices 7 of its respective vehicle 3.

Moving yet one level down in the method flow illustrated in FIG. 1, is illustrated how correlated signals $8_1, 8_2, \ldots, 8_{n-1}, 8_n$ from said plurality of said observer neural network computers $2_1, 2_2, \ldots, 2_{n-1}, 2_n$ are combined, whereupon, as illustrated at the bottom level of the method flow in FIG. 1, said target neural network computer 1 for use in cognitive computing systems in automotive safety applications is programmed based on said combined correlated signals.

In embodiments hereof correlated signals $8_1, 8_2, \ldots, 8_{n-1}, 8_n$ from multiple vehicles 3, for example one hundred vehicles 3, are combined, which may include transmitting or providing such signals from the plurality of vehicles to a central location, storage device and/or processor (not shown) by wireless communication or in any other known fashion. Combining correlated signals $8_1, 8_2, \ldots, 8_{n-1}, 8_n$ from at least one hundred vehicles 3 provides for enhancing programming of said target neural network computer 1 as programming thereof will be based on the experience of hundreds of vehicle drivers 9, possibly from all around the world.

Thus, programming a target neural network computer 1 for use in cognitive computing systems in automotive safety applications according to the herein proposed method provides for combining the "experience" of numerous observer neural network computers $2_1, 2_2, \ldots, 2_{n-1}, 2_n$, which may be hundreds, such that target neural network computer 1 based active safety systems for use in future vehicles can benefit from the experience of numerous drivers and vehicles. Thus, according to the proposed method of programming, such target neural network computers 1 will be exposed to large number of input patterns that should trigger certain responses preparing them for use in active safety systems of future vehicles.

In conclusion, through integrating a respective observer neural network computer 2 into respective active safety systems of multiple vehicles 3 there is provided a basis for enhancing the self-learning programming experience of said observer neural network computer 2, in particular as this self-learning programming experience now can be based on the experience of many vehicle drivers 9, possibly from all around the world.

Through observing signals 4 from a forward facing pedestrian detection camera 5, such as a forward facing pedestrian detection camera 5, and allowing each respective observer neural network computer 2 to correlate what it sees through its pedestrian detection camera 5 with actions taken by a driver 9 of its respective vehicle 3, each respective observer neural network computer 2 is able to program itself. If a driver's action results in an accident or corrective actions, said observer neural network computer 2 will learn what to avoid. Thus, a main purpose of monitoring driver 9 actions is to correlate non-action or incorrect-action by a driver 9 that can be attributed to distraction and mental state.

The point of using an observer neural network computer 2 is that the correlation of what is observed by the camera 5 and driver 9 actions occurs real-time in a vehicle 3 and may be learned/remembered by the observer neural network computer 2. This greatly reduces the amount of processing required, thus making it possible to combine data from more than one hundred drivers for programming a target neural network computer 1.

Further, since there is no actual recording of a driver's actions, privacy is preserved through the proposed method. However, it is envisaged that an owner of said observer neural network computers 2 could pay a fee to, or otherwise remunerate, an owner/driver 9 of each respective vehicle 3 for "teaching" said observer neural network computers 2, and thus providing a knowledge base for programming of said target neural network computers 1.

Thus, "teaching" observer neural network computers 2 and consequently target neural network computers 1 can be provided as a service to manufacturers thereof, or manufacturers of active vehicle safety systems, that will result in revenue, or other remuneration, to vehicle 3 manufacturers and/or vehicle 3 owners/drivers 9.

FIG. 2 illustrates driver action monitoring devices 7 in a vehicle 3 having an observer neural network computer 2 (see FIG. 1) integrated into an active safety system (not shown) thereof suitable for use with embodiments of the proposed method.

As illustrated in FIG. 2, said driver action monitoring devices 7 comprises a driver monitoring camera $7_1$ arranged to observe a driver's 9 actions in various situations, a steering wheel angle sensor $7_2$, a throttle position sensor $7_3$ and a brake pedal position sensor $7_4$. Additional examples of driver actions that can monitored, although not illustrated in FIG. 2, are: activation of turn indicator and hazard warning, activation of headlights, activation of windscreen wipers, etc. All of the above driver 9 action monitoring devices 7 being arranged to provide signals 6 (see FIG. 1) to be observed by said observer neural network computer 2 of its respective vehicle 3 to enhance the learning experience thereof.

It should be noted that the vehicle active safety systems or applications, the observer neural network computers 2, the target neural network computer 1, and any other computers, processors and/or devices described herein may comprise memory or storage and a central processing unit, such as one or more microprocessors, microcontrollers, or other programmable devices and may also, or instead, include an application specific integrated circuit, a programmable logic device, or a digital signal processor in order to perform any function and/or operation described herein. Any programmable device such as a microprocessor or microcontroller may further comprise computer executable code that controls operation of the programmable device to perform the various functions and/or operations described herein.

Thus, while there have been shown and described and pointed out fundamental novel features of the embodiments herein, it will be understood that various omissions and substitutions and changes in the form and details of the devices illustrated, and in their operation, may be made by those skilled in the art. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A method of programming a target neural network computer for use in cognitive computing systems in automotive safety applications, the method comprising:
   integrating a plurality of observer neural network computers into active safety systems of a plurality of vehicles, each observer neural network integrated into one of the plurality of vehicles, the observer neural network computers integrated to observe signals;
   arranging each observer neural network computer to observe signals from a forward facing camera of its respective vehicle;
   arranging each observer neural network computer to observe signals from one or more driver action monitoring devices of its respective vehicle;
   arranging each observer neural network computer to process the observed signals from the forward facing camera of its respective vehicle and to correlate them with the observed signals from the one or more driver action monitoring devices of its respective vehicle;
   combining correlated signals from the plurality of observer neural network computers; and
   programming the target neural network computer for use in cognitive computing systems in automotive safety applications based on the combined correlated signals.

2. The method of claim 1 wherein arranging each observer neural network computer to observe signals from the forward facing camera of its respective vehicle comprises arranging each observer neural network computer to observe signals from a forward facing pedestrian detection camera of its respective vehicle.

3. The method of claim 1 wherein arranging each observer neural network computer to observe signals from one or more driver action monitoring devices of its respective vehicle comprises arranging each observer neural network computer to observe signals from at least one driver monitoring camera.

4. The method of claim 1 wherein arranging each observer neural network computer to process the observed signals from the forward facing camera of its respective vehicle comprises arranging each observer neural network computer to process the observed signals from the forward facing camera of its respective vehicle to recognize visual patterns and to correlate said visual patterns with the observed signals from the one or more driver action monitoring devices of its respective vehicle.

5. The method of claim 1 wherein arranging each observer neural network computer to observe signals from one or more driver action monitoring devices of its respective vehicle comprises arranging each observer neural network computer to observe signals from at least one of a steering wheel angle sensor, a throttle position sensor, a brake pedal position sensor, activation of a turn indicator, activation of a hazard warning, activation of headlights and activation of windscreen wipers.

6. The method of claim 5 wherein integrating a plurality of observer neural network computers into active safety systems of a plurality of vehicles comprises integrating each observer neural network into one of the plurality of vehicles only to observe signals and integrating a respective observer neural network computer into respective active safety systems of at least one hundred vehicles.

7. The method of claim 1 wherein combining correlated signals from said plurality of said observer neural network computers comprises combining correlated signals from at least one hundred vehicles.

8. A method for use in programming a target neural network computer for a cognitive computing system in an automotive safety application, the method comprising:
   integrating a plurality of observer neural network computers into active safety systems of a plurality of vehicles, each observer neural network integrated into one of the plurality of vehicles;
   arranging each observer neural network computer to observe signals from a forward facing camera of its respective vehicle;
   arranging each observer neural network computer to observe signals from one or more driver action monitoring devices of its respective vehicle;
   arranging each observer neural network computer to process the observed signals from the forward facing camera of its respective vehicle and to correlate them with the observed signals from the one or more driver action monitoring devices of its respective vehicle; and
   combining correlated signals from the plurality of observer neural network computers, the correlated signals for use in programming the target neural network computer.

9. The method of claim 8 wherein arranging each observer neural network computer to observe signals from the forward facing camera of its respective vehicle comprises arranging each observer neural network computer to observe signals from a forward facing pedestrian detection camera of its respective vehicle.

10. The method of claim 8 wherein arranging each observer neural network computer to observe signals from one or more driver action monitoring devices of its respective vehicle comprises arranging each observer neural network computer to observe signals from at least one driver monitoring camera.

11. The method of claim 8 wherein arranging each observer neural network computer to process the observed signals from the forward facing camera of its respective vehicle comprises arranging each observer neural network computer to process the observed signals from the forward facing camera of its respective vehicle to recognize visual patterns and to correlate said visual patterns with the observed signals from the one or more driver action monitoring devices of its respective vehicle.

12. The method of claim 8 wherein arranging each observer neural network computer to observe signals from one or more driver action monitoring devices of its respective vehicle comprises arranging each observer neural network computer to observe signals from at least one of a steering wheel angle sensor, a throttle position sensor, a brake pedal position sensor, activation of a turn indicator, activation of a hazard warning, activation of headlights and activation of windscreen wipers.

13. The method of claim 12 wherein integrating a plurality of observer neural network computers into active safety systems of a plurality of vehicles comprises integrating each observer neural network into one of the plurality of vehicles only to observe signals and integrating a respective observer neural network computer into respective active safety systems of at least one hundred vehicles.

14. The method of claim 8 wherein combining correlated signals from said plurality of said observer neural network computers comprises combining correlated signals from at least one hundred vehicles.

15. A vehicle having a target neural network for use in a cognitive computing system in an automotive safety application, the target neural network programmed according to the method of claim 1.

16. A vehicle having a target neural network a cognitive computing system in an automotive safety application, the target neural network programmed according to the method of claim 8.

17. A target neural network for use in a cognitive computing system in an automotive safety application, the target neural network programmed according to the method of claim 1.

18. A target neural network for a cognitive computing system in an automotive safety application, the target neural network programmed according to the method of claim 8.

19. A method of programming a target neural network computer for use in cognitive computing systems in automotive safety applications, the method comprising:
   combining correlated signals from a plurality of observer neural network computers, the plurality of observer neural network computers integrated in active safety systems of a plurality of vehicles, each observer neural network integrated in one of the plurality of vehicles, each observer neural network computer arranged to observe signals from a forward facing camera of its respective vehicle and to observe signals from one or more driver action monitoring devices of its respective vehicle, each observer neural network computer arranged to process the observed signals from the forward facing camera of its respective vehicle and to correlate them with the observed signals from the one or more driver action monitoring devices of its respective vehicle; and
   programming the target neural network computer for use in cognitive computing systems in automotive safety applications based on the combined correlated signals.

20. A target neural network for a cognitive computing system in an automotive safety application, the target neural network programmed according to the method of claim 19.

* * * * *